INVENTOR.
JEROME H. LEMELSON

INVENTOR.
JEROME H. LEMELSON

United States Patent Office 3,481,042
Patented Dec. 2, 1969

3,481,042
SURFACE SENSING APPARATUS
Jerome H. Lemelson, 8B Garfield Park Apartments,
Metuchen, N.J. 08840
Continuation-in-part of application Ser. No. 477,467,
Dec. 24, 1954. This application July 10, 1963, Ser.
No. 294,076
Int. Cl. B23q 17/04; B23f 23/08
U.S. Cl. 33—174                                   3 Claims

ABSTRACT OF THE DISCLOSURE

An automatic inspection apparatus is provided which employs automatically controlled manipulation means for transporting a sensing head along one or more predetermined paths relative to a workpiece, so as to allow the sensing head to sense surfaces of the work. Signals are generated during movement of the probe which are indicative of the location of the probe. By generating location signals when a sensing head senses the presence of the surface of the work and utilizing said signals to control or gate the signals generated with the probe movement, an electrical indication is obtained of the location of the surface.

Means are also provided for recording signals by automatic measurement and automatically performing computing functions to determine if the dimensions or surface locations so measured are in accordance with standards.

---

This invention relates to automatic inspection apparatus and is a continuation in part of my copending applications, Ser. No. 477,467 filed on Dec. 24, 1954 for Automation Devices, which is now abandoned and Ser. No. 250,942 filed Jan. 11, 1963 now patent No. 3,226,833, for Automatic Inspection Apparatus and Method.

In effecting various measurement functions to assure quality acceptance of a product regarding dimensions, locations of surfaces, tolerances and the like, both manual and preset automatic devices have been employed heretofore to effect these functions. The use of manual devices such as micrometers and calibers is, of course, time consuming and often subject to personal error. Preset devices which perform a single measurement function are not flexible enough to measure a plurality of different articles or dimensions.

This invention is primarily concerned with electromechanical measurement employing apparatus having a wide range of measurement capabilities which is automatically operative and positionable relative to work-in-process of many different shapes and sizes for automatically measuring different dimensions thereof. It is accordingly a primary object of this invention to provide an improved automatic measurement apparatus capable of measuring a plurality of different dimensions without the need for manual adjustment or personal attention.

Another object is to provide an improved automatic measurement apparatus having a probe operative for sensing surfaces and positionable to sense various surfaces for location and measurement purposes.

Another object is to provide a new and improved automatic measurement method and system.

Another object is to provide improvements in the automatic measurement apparatus disclosed in my copending application Ser. No. 250,942, now patent No. 3,226,833.

Another object is to provide means associated with a machine tool for automatically sensing one or more surfaces of a workpiece and for providing signal indication of surface location which may be utilized to correct the control or position of the tool prior to performing an automatic operation on the work.

Another object is to provide surface sensing apparatus and a control system therefore for performing either the operation of automatically inspecting and measuring locations of surfaces of a workpiece, the operation of correcting an automated tool or the combined operations of both inspecting and indicating the location of surfaces and the correction of the position of an automatic tool relative to a workpiece or surface thereof.

With the above and such other objects in view, as may hereinafter more fully appear, the invention consists of the novel construction, combination and arrangement of parts as will be hereinafter or fully described and illustrated in the accompanying drawings, wherein are shown embodiments of this invention, but it is to be understood that changes, variations and modifications may be resorted to which fall within the scope of the invention as claimed.

In the drawings:

FIG. 5' shows a modification to FIG. 5.

Figures 1, 2:
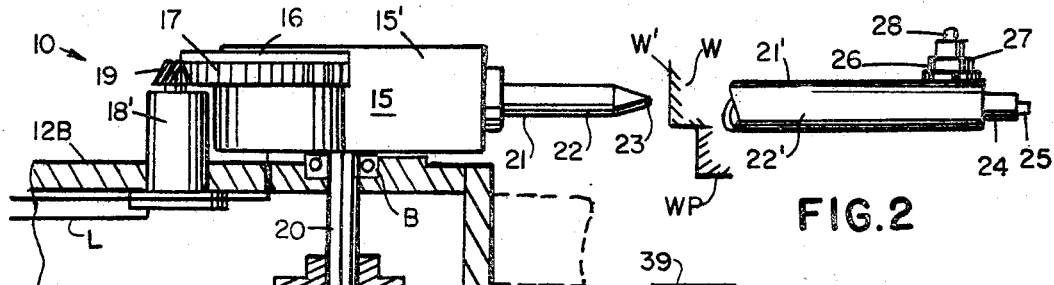
FIG. 1 is a side view with parts broken away for clarity of the head or working end of an automatic inspection probe operative to be positioned relative to a workpiece and to automatically sense the location of a particular surface or surfaces thereof.
FIG. 2 is a partial view of an electro mechanical probe applicable to the apparatus of FIG. 1.

There is shown in FIG. 1 part of an automatic inspection apparatus 10 which includes a base or mount 12 for an inspection probe assembly 15 which is journalled for rotation on mount 12. The mount 12 may be provided stationary on a base adjacent a conveyor for articles to be inspected or may be further movable in any of a plurality of directions by manipulator apparatus as illustrated in my said copending applications to position a probe or surface sensing transducer 23 immediately adjacent an article or assembly to be measured or inspected. In its simpliest form, the mount 12 may be moved longitudinally to advance and retract the inspection probe assembly 15. It may also be moved vertically and/or laterally to further position said assembly. By a combination of longitudinal, lateral, vertical and one or more rotary motions imparted to the mount 12 it is seen that the inspection probe assembly 15 may be automatically positioned at substantially an infinite number of locations in space within a given region to effect predetermined positioning of the inspection probe assembly 15. Such positioning may be effected by variable programming means of known design such as found in U.S. Patents 2,475,245 and 3,069,608, or provided hereinbelow.

The inspection probe assembly 15 comprises a housing 15' to which is secured a bearing B which is journalled for rotation on a pin or shaft 20 extending vertically downward through the interior of mount 12 and secured at its lower end thereto. The housing 15' is thus rotatable about the axis of shaft 20. Secured to the rear wall of housing 15' is a gear plate 16 having bevel gear teeth 17 cut therein which are engaged by a small bevel gear 19 secured to the shaft of a reversible electrical gear motor 18 which is secured to the upper wall 12B of the base or mount 12. Wires L extend from the motor 18 to an automatic controller to be described and other wires (not shown) extend from electro mechanical apparatus mounted within housing 15' and the surface sensing transducer of the probe to measurement and recording apparatus situated beyond mount 12. The reversible motor (not shown) mounted within housing 15' is operative to longitudinally project and retract an arm 22 at the end of which the surface sensing probe or transducer 23 is mounted. This motor is operative to stop automatically upon retraction of arm 22 to perform the functions which will be described hereinbelow.

The inspection probe assembly 15 includes a probe assembly portion 21 which comprises an elongated arm 22 which is longitudinally movable out of the housing 15' upon automatically prepositioning said housing relative to the surface of a workpiece. At the end of arm 22 there is mounted a surface sensing probe 23 which, in its simplest form, may comprise a compression actuated limit switch which is normally spring loaded in its open state. Other forms of the probe 23 may also comprise surface sensing electrical means such as capacitance, electro-magnetic, radiation or other activated transducer relays operative to generate a signal upon positioning an object or surface either in contact with the end thereof or in the immediate vicinity thereof.

Also illustrated in FIG. 1 is an extension 14 of the base or housing 12 which is secured to the end wall 13 thereof and may comprise a further probe assembly operative to cooperate with probe assembly 21 or a tool such as a motor driven cutting tool, with which the probe arm 21 is cooperative to locate a particular surface and provide output signals which are indicative of the location of said surface for correcting the control system operating the tool.

In the operation of the automatic surface sensing apparatus described herein, a positional relationship must be established between the carrier or manipulation means, such as the base 12 or a mount on which said base is movable, and the work being measured. Accordingly, the work W is shown in FIG. 1 as being retained and prepositioned by a work holding fixture WP, such as an automatic clamping means which engages a portion of the work. Variations in the location of the surface W' of W being measured or sensed will thus generally fall within a predetermined range of possible variations when work is so prepositioned by the holding fixture WP and the arm or fixture 12 may be automatically controlled to position the retracted probe assembly 21 in a position whereby the probe sensor 23 will engage or sense the presence of the surface W' during a point in its travel outward from housing 15'.

FIG. 2 illustrates a modified type of probe arm assembly, denoted 21', which may supplement or replace the probe assembly 21 of FIG. 1. Projecting longitudinally from the end of a longitudinally movable arm 22' is a first surface sensing transducer 24 having a probe nose 25 at the end thereof which is operative to effect generation of a signal indicating the location of a surface it is contacting or immediately adjacent. A second transducer 27 is provided on a mount 26 and extends laterally to arm 22' and has a probe nose 28 extending in a lateral direction to that in which probe nose 25 extends. Thus longitudinal movement of arm 22' may be utilized to effect the sensing of a surface in longitudinal alignment therewith and lateral movement of arm 22' may be utilized to sense a surface laterally aligned therewith. If the arm 22' is operative to be positionally rotated, then most any surface accessible to the probe tip 28 may be sensed by the automatic control of the rotation of arm 22' per se or in cooperation with a radial movement thereof. In their simplest forms, the transducers 24 and 27 may comprise pressure actuated limit switches.

Figures 3, 4:
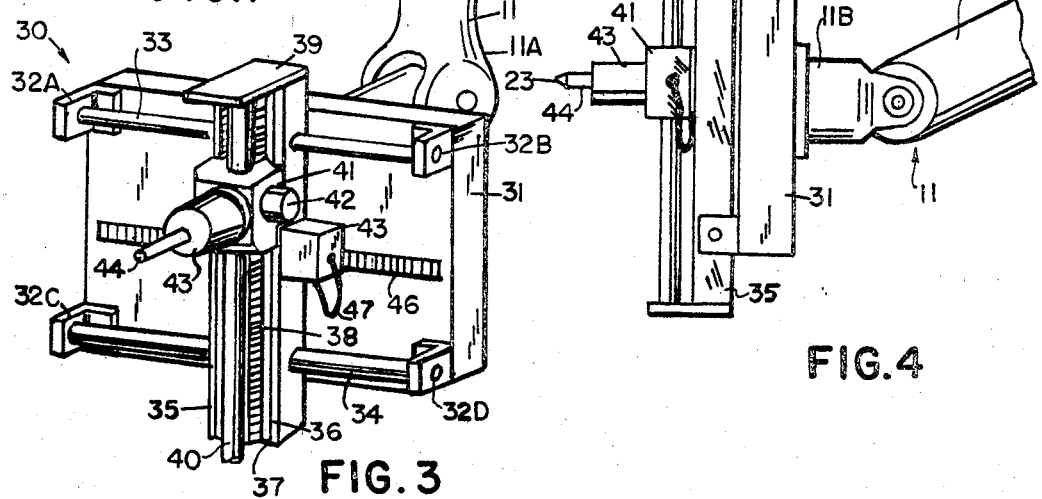
FIG. 3 is an isometric view showing part of an automatic inspection apparatus including a mount for a surface sensing probe movable thereon.
FIG. 4 is a side view of the apparatus of FIG. 3.

FIG. 3 illustrates a probe mount and assembly 30 designed to permit a probe or surface sensing transducer 44 to be laterally and longitudinally positioned relative to an article of manufacture or assembly whereafter longitudinal movement of said probe will permit it to be positioned throughout a substantially infinite number of locations within a given volume. In other words, many different surfaces of a workpiece or assembly may be sensed once the probe mount 30 is prepositioned adjacent to said work. A manipulation apparatus 11 is shown as having a first arm 11A pivotally supporting a second arm 11B which is secured to the rear face of a plate 31 which is either angularly adjustable relative to arm 11A by manual or automatic means for positioning the assembly 30 relative to a workpiece or conveyor therefor. The base plate 31 mounts a plurality of brackets including brackets 32A and 32B which support a cylindrical rod 33 and brackets (32C and 32D) which support a second cylindrical rod 34 extending parallel to rod 33. A second base 35 in the form of an elongated block of metal is longitudinally movable along rods 33 and 34 and movably supports a third base 41 on which is mounted the probe head 43. The third base 41 comprises a housing or block which is movable along ways 37 provided in the face 36 of the base 35 and a reversible gear motor 42 has a toothed gear or wheel (not shown) operative to engage teeth 38 cut in a surface of the V-ways cut in the base 35 for longitudinal movement of base 41 with respect to base 35. End plate 39 supports one end of the rod 40 while a second end plate (not shown) is supported at the other end of base 35 and supports the other end rod 40. A second reversible gear motor (not shown) is mounted within a housing 45 secured to the sidewall of base 35 and is operative to drive the assembly including 35 longitudinally along rods 33 and 34 by engagement of a toothed wheel secured to its output shaft with teeth 46 cut in the face of plate 31 which extend in a line parallel to the rods 33 and 34. The teeth 46 may also be provided as a flat spur gear plate secured to base plate 31. Notation 47 refers to a slack cable extending between the housing 45 and the base plate 31 for electrically connecting the probe way for its drive motor mounted within 43, the motor 42 and any other electrical devices mounted within or on housing 45 with a source of power and control signals which includes a positional computer of the type illustrated in FIG. 5.

Figure 5:
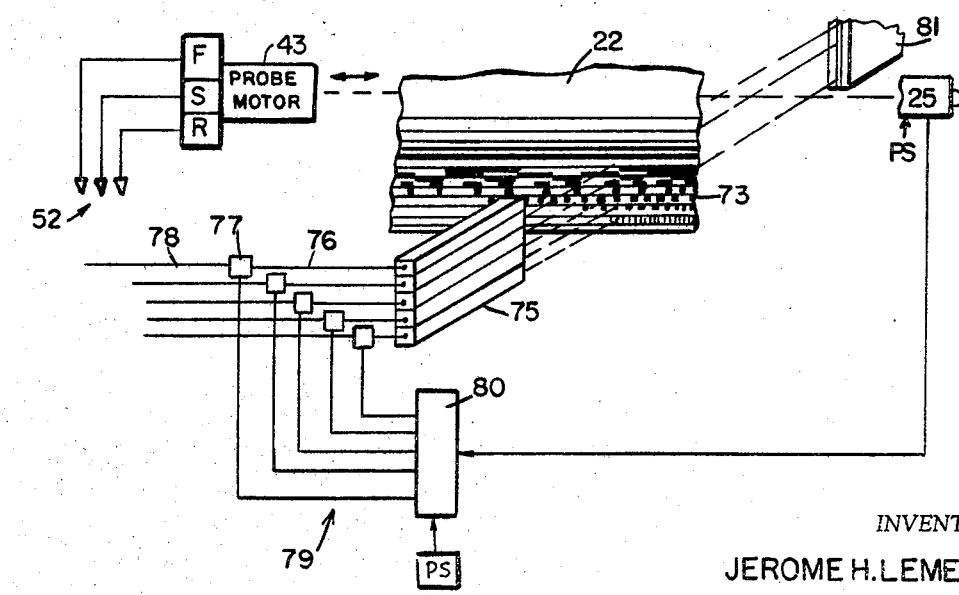
FIG. 5 is a schematic block diagram illustrating aspects of the automatic control system applicable to the apparatus of FIGS. 1 to 4.
Figure 5:
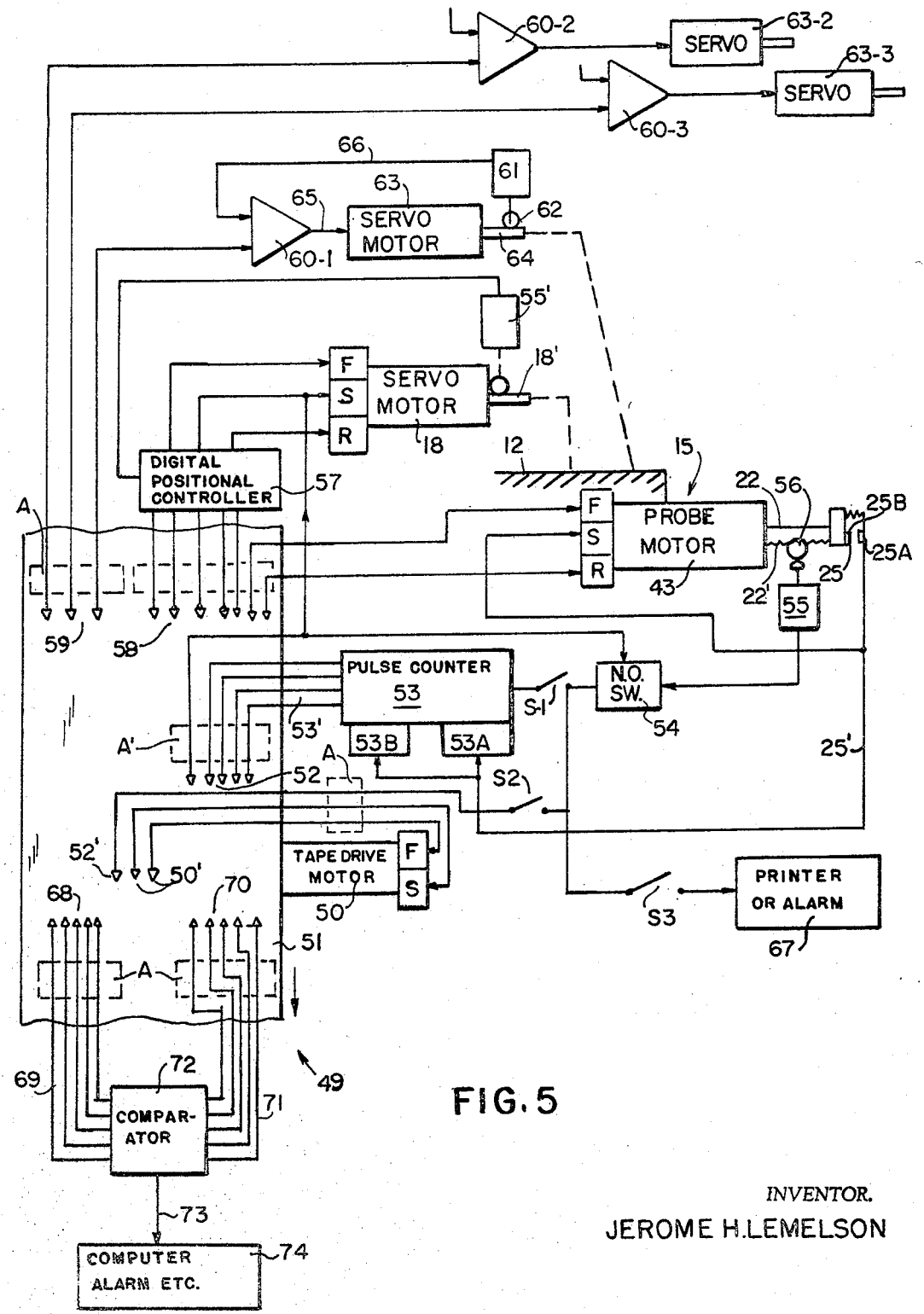

FIG. 5 illustrates aspects of the control system utilized to position the surface indicating probe hereinabove described and to effect the automatic operation thereof. In order to simplify the diagram, the electrical power supplies have not been illustrated but it is assumed that they are provided on the correct sides of all switches, relays, amplifiers, motors, controls, transducers, counters, and other devices illustrated so that the functions being described will be operative.

A computer or positional controller 49 is illustrated in part and includes a recording member such as a magnetic recording tape 51, punched tape or the like which is movable relative to a plurality of transducers for effecting the reproduction of signals which are operative to effect the proper positional control of the probe and also recording functions to be described. The tape 51 is either driven at constant speed or intermittently under the control of signals reproduced from control channels of the tape by heads 50' and fed to the start and stop controls F and S of constant speed tape drive motor 50.

Positioning of the mount 12 for the inspection probe assembly 15 is first effected by reproducing first signals from control channels of the tape 51 by means of banks of reproduction transducers 58 and 59. The signals so reproduced are operative to automatically control the servo motors which position the assembly of which mount 12 terminates. One of the servo motors, denoted 63, is shown as having a control input 65 which is the output of a comparator device 60-1 which receives a first reference of variable signal reproduced from a particular channel of tape 51 which is bucked against a feedback signal generated on a second input 66 thereto and provides an error or difference signal on its output 65 which is utilized to position the reversible servo motor 63 for positioning the assembly 12 in a first direction. Notations 60-2 and 60-3 refer to comparator devices associated with other servo motors 63-2 and 63-3 which are operative to position the mount 12 in different directions than that positioned by servo motor 63. The feedback signal is generated on input 66 by means of a selsyn motor 61 coupled whereby its shaft 62 is driven by the output shaft 64 of servo motor 63. The signal generated on input 66 includes an output of selsyn motor 61 is thus proportional to the actual position of shaft 64 and, if equal to the reference signal generated by the controller 49, then, in accordance with the well-known principles of servo operation, servo motor 63 is operative to effect the desired degree of positioning of a mount 12 relative to a base.

While the motor 18, which was illustrated in FIG. 1 as being operative to rotationally position the inspection probe assembly 15, may also be positioned by the generation of a reference signal and a feedback signal to be compared therewith in the manner that motor 63 is controlled, means are shown in FIG. 5 for controlling motor 18 by digital means. A plurality of digital signals are reproduced by reproduction heads 58 from tape 51 and are fed to a digital positional controller 57 which receives feedback signals from a pulse generator or tachometer 55' coupled to the shaft 18' of motor 18. The controller 57 is operative to provide output signals for energizing the start control F, stop control S, and reverse control R of motor 18. It is assumed that the signals reproduced by the heads of the bank 58 of reproduction transducers are so spaced on the recording member 51 that motor 18 will not be operative to reverse or reposition assembly 12 until sufficient time has lapsed for the probe motor 43 to advance the probe head to engage a surface of the work and retract therefrom. Notations A refer to reproduction amplifiers in the outputs of the reproduction transducers 58 and 59. A' refers to recording amplifiers.

Once the positional servos which are controlled by signals reproduced by reproduction transducers 58 and 59 have been so controlled to preposition the mount 12 or probe head assembly 15, the start control F of probe drive motor 43 is energized by the reproduction of a signal from another channel of recording member 51 and the probe arm 22 is driven longitudinally outward therefrom until the transducer 25 is energized upon sensing a surface. This may be effected by contact of movable switch contactor 25A against stationary contact 25B which generates a pulse signal which is transmitted to both the stop control S of probe motor 43 and/or the reverse control R thereof. During the longitudinal outward movement of arm 22, teeth 22' provided longitudinally along a side of arm 22 are engaged by a toothed wheel 56 which rotates a pulse generator 55 which generates pulses with predetermined degrees of arm movement of 22. The pulses are fed through a normally open switch 54 to the input of a pulse counter 53 having the ability to generate a binary indication of the number of pulses received thereby on a plurality of outputs 53' which extend to a bank 52 of recording transducers which are operative to record a digital indication of the degree of movement of the probe arm 22 up to the point where the probe transducer 25 becomes energized upon contact with or by sensing the surface to be measured. The output 25' of the switch or transducer 25 is thus also passed to the trigger input 53A of the counter 53 and is operative to generate said binary indication on the output lines 53' thereof when so pulsed. The same signal is also utilized to energize the reset input 53B of the counter so that the counter is reset to 0 for the next measurement. After the probe motor 43 retracts probe arm 22, under the control of a signal reproduced from recording member 51, the next measurement function may be automatically performed by further movement of the recording member and the reproduction of further positional control signals. The digital signals recorded through heads 52 may remain for the purposes of retaining a record of the measurement and reproduced thereafter for comparison with other signals recorded in predetermined locations on the recording member which are indicative of the desired movement of the arm 22 which indicates a standard or quality acceptable tolerance or location of the surface being measured.

Disposed between the output of pulse generator 55 and the input to counter 53 is a normally open switch 54 which is closed by a signal reproduced from recording member 51 only during that interval of the entire cycle in which it is desired to measure the movement of probe arm 22. However, if the pulse generator 55 is operative to generate pulses only during the outward movement of arm 22 and the counter 53 is automatically reset when the probe 25 contacts the workpiece, the switch 54 may be eliminated since the counter will only operate when the probe is in motion towards the surface to be measured.

Also shown in FIG. 5 are a plurality of manually or otherwise openable switches S1, S2 and S3. Switch S1 is disposed between the output of pulse generator 55 and counter 53 and functions such that when it is open and switch S2 is closed, the output of pulse generator 55 will be passed directly to a recording transducer 52'. If the tape 51 is in motion during the interval, probe arm 22 is driven longitudinally outward, a train of pulses will be recorded along the recording channel against which recording transducer 52' is disposed and the number of pulses so recorded will be a proportional indication of the distance the probe arm 22 has travelled until the surface sensor 25 has made contact with or sensed the surface to be measured. This train of pulses may be compared with a standard train or reproduced thereafter and utilized to provide a binary digital or other indication of the distance travelled by the probe in contacting the surface to be measured.

The switch S3, when closed, will pass the train of pulses generated by pulse generator 55 to a printer 67 which is operative to print, either in code or numerical notation, an indication of the distance moved by probe arm 22 in contacting a surface to be measured. The printer may also contain a comparator and alarm device preset by signals reproduced from recording member 51 and operative to generate an alarm should the surface being measured fall beyond predetermined tolerance limits.

By recording a plurality of groups of digital and/or analog signals on different channels of the recording member 51 and reproducing said groups in sequence, it is thus seen that the inspection probe assembly 15 may be sequentially positioned at different locations within a given spacial volume adjacent which are located different surfaces of a workpiece or assembly of workpieces which may be automatically located by further movement or projection of the probe transducer 25 to the vicinity of or against said surfaces and may provide signals which are indicative of the locations of said surfaces with respect to a base related to the apparatus mounting the probe. As stated, all servo motors may be digitally controlled in accordance with known control techniques involving the reproduction of digital signals or may be controlled by analog means in which reference signals are reproduced from the recording member and are bucked against feedback signals generated with the operation of the respective motor or movement of the part controlled thereby for generating error signals which are operative to control the motor.

The signals indicative of the locations of the surfaces scanned by the described automatic measurement probe and recorded on record member 51 by the transducers 52 may be reproduced by a bank of reproduction transducers 70 and compared in an electronic comparator 72 with standard signals reproduced from recordings on the record member by a further group of reproduction heads 68 and leads 69. The output 73 of comparator 72 is connected to a computer or alarm device 74 for further analysis or for generating an alarm when predetermined variations occur between values of the standard and actual measurement signals.

FIG. 5' provides means for generating a plurality of signals as a parallel code which signals are indicative of the position of the probe without the need to employ a counter, shift registers or the like to generate said code. The code is generated by scanning a code strip 73 which is secured to or part of the probe arm 22. In FIG. 5', the code strip 73 comprises a thin bar of optical glass containing digital binary codes or the like etched, machined therein or photographically provided in a film on the surface of the strip. Each code which is part of a numerically progressing code array extending along the length of the strip, extends laterally across the strip and occupies a small unit length of the strip. By scanning the code with a bank 75 of photomultiplier tubes or the like which bank is secured to the probe housing 15 and positioned immediately adjacent the code bar 73 to scan individual code strips, an indication of the degree the probe arm 22 has moved relative to the housing 15' is derived by noting the manner in which the outputs 76 of the photomultiplier tubes 75 are energized. Said output lines 76 extend to respective normally open monostable switches 77 having switching inputs which are energizable when the probe sensor 25 becomes energized upon sensing a surface. The signal output of sensor 25 is passed to a relay or pulse transformer 80 having multiple outputs 79 each of which extend to a respective switching input of a switch in the bank 77 so that all the switches thereof are simultaneously energized to close. The outputs 78 of switches 79 may extend to recording transducers for recording the code on the recording member 51 and/or to a comparator device operative for comparing the code with a predetermined value to determine if the surface measured is located similar to a desired or predetermined value. If the distance between two surfaces is required, codes derived by sensing said surfaces may be compared by temporarily recording each code and electronically summing or otherwise performing thereon.

It is noted that if the probe drive motor is controlled entirely by signals reproduced from the controller 49 in employing the position indicating signal generating means of FIG. 5', it will not be necessary to completely retract the probe arm 22 after each surface measurement since measurement is not dependent on single pulses generated during travel of the probe from a "home" position. In other words, the duration or characteristic of a signal reproduced from controller 49 in sequence may be used to reverse motor 43 and retract the probe a sufficient degree to clear the work during the next movement of its manipulation apparatus.

The photomultiplier tubes in bank 75 are provided with optical means including a fine slit to permit each to scan a code track of strip 73. A slit source 81 of light is shown mounted on the other side of the code strip to scan light into the photomultiplier devices of bank 75 and is supported by 15'.

A latitude of modification and substitution is intended in the foregoing disclosure and, in certain instances, some features of the invention will be used without a corresponding use of other features. Accordingly, it is appropriate that the disclosure be construed broadly and in a manner consistent with the spirit and scope of the invention.

I claim:
1. Surface measuring apparatus comprising:
 means for sensing a surface to be measured,
 manipulation means for said sensing means,
 a variable program control means for controlling the operation of said manipulation means and positioning said sensing means adjacent a surface to be measured,
 said program control means including a record member and means for reproducing positional control signals from said record member,
 means for using said positional control signals to preposition said sensing means,
 means for relatively positioning said workpiece and said manipulation means,
 signal generating means associated with said manipulation means and said sensing means for obtaining signals representative of the location of a surface of said workpiece relative to said manipulation means, and
 recording means for recording said signals representative of the surface being measured on predetermined areas of said recording member.

2. Surface measuring apparatus comprising:
 means for sensing a surface to be measured,
 manipulation means for said sensing means,
 a variable program control means for controlling the operation of said manipulation means and positioning said sensing means adjacent a surface to be measured,
 said program control means including a record member and means for reproducing positional control signals from said record member,
 means for using said positional control signals to preposition said sensing means,
 means for positioning a workpiece relative to said manipulation means,
 signal generating means associated with said manipulation means and said sensing means for obtaining electrical signals representative of the location of a surface of said workpiece relative to said manipulation means,
 said record member having standard signals recorded thereon which are indicative of predetermined locations of surface being measured, means for reproducing said standard signals, and
 means for comparing said standard signals with the signals generated as representative of the movement of said sensing means.

3. Surface measuring apparatus in accordance with claim 2 including means for recording signals representative of the degree of movement of said sensing means in substantially predetermined positional relationship with respect to said standard signals recorded on said record member, and means for reproducing said representative signals from said record member and comparing same with said standard signals.

References Cited

UNITED STATES PATENTS

| 2,554,171 | 5/1951 | Brunot | 33—174 |
| 2,807,973 | 10/1957 | Meyer | 33—174 |
| 2,835,042 | 5/1958 | Tandler | 33—174 |
| 2,906,179 | 9/1959 | Bower | 33—174 |
| 2,942,729 | 6/1960 | Bowen | 33—174 |
| 2,475,245 | 7/1949 | Leaver | 318—20.102 |
| 2,629,936 | 3/1953 | Cronstedt | 33—174 |
| 2,697,879 | 12/1954 | Tandler | 33—174 |
| 2,755,422 | 7/1956 | Livingston | 318—20.102 |
| 2,927,258 | 3/1960 | Lippell | 318—20.105 |

FOREIGN PATENTS

| 1,174,117 | 3/1959 | France. |

OTHER REFERENCES

Kliever—Control Engineering (II), November 1956, pp. 107–112. American Machinist, February 1959, pp. 101–103. Watkins—Control Engineering (I), November 1956, pp. 100–106.

Report on Contract AF 33(038)6878, Digitron-Air Material Command, MCPBX5-4.

SAMUEL S. MATTHEWS, Primary Examiner

U.S. Cl. X.R.

90—13